US008984496B2

(12) United States Patent
Devane et al.

(10) Patent No.: US 8,984,496 B2
(45) Date of Patent: Mar. 17, 2015

(54) EXTENSIBLE INTERNAL REPRESENTATION OF SYSTEMS WITH PARALLEL AND SEQUENTIAL IMPLEMENTATIONS

(75) Inventors: Charles J. Devane, Upton, MA (US); Kiran Kumar Kintali, Ashland, MA (US)

(73) Assignee: The MathWorks, Inc., Natick, MA (US)

( * ) Notice: Subject to any disclaimer, the term of this patent is extended or adjusted under 35 U.S.C. 154(b) by 1319 days.

(21) Appl. No.: 11/130,476

(22) Filed: May 16, 2005

(65) Prior Publication Data

US 2006/0064680 A1    Mar. 23, 2006

Related U.S. Application Data

(60) Provisional application No. 60/611,659, filed on Sep. 20, 2004.

(51) Int. Cl.
*G06F 9/45*    (2006.01)

(52) U.S. Cl.
CPC ........................................ *G06F 8/41* (2013.01)
USPC ........................................................ 717/136

(58) Field of Classification Search
USPC .................. 717/104–109, 119, 126, 136–139, 717/146–147, 149, 151–161
See application file for complete search history.

(56) References Cited

U.S. PATENT DOCUMENTS

| | | | |
|---|---|---|---|
| 5,586,020 A * | 12/1996 | Isozaki | 717/159 |
| 6,658,630 B1 * | 12/2003 | Threatt et al. | 716/3 |
| 6,684,388 B1 * | 1/2004 | Gupta et al. | 717/136 |
| 6,848,100 B1 * | 1/2005 | Wu et al. | 717/157 |
| 6,901,579 B1 * | 5/2005 | Suguta | 717/108 |
| 6,968,544 B1 * | 11/2005 | Schneider | 717/146 |
| 2003/0014743 A1 * | 1/2003 | Cooke et al. | 717/161 |
| 2003/0233640 A1 * | 12/2003 | Reynaud | 717/154 |

(Continued)

FOREIGN PATENT DOCUMENTS

WO    2004/042499 A2    5/2004

OTHER PUBLICATIONS

"Compilers, Principles, Techniques, and Tools" by Aho et al., Addison-Wesley, Mar. 1986, 8 pages.*

(Continued)

*Primary Examiner* — H S Sough
*Assistant Examiner* — Carina Yun
(74) *Attorney, Agent, or Firm* — Harrity & Harrity, LLP

(57) ABSTRACT

The present invention provides systems and methods which allow the translation of a first representation into an intermediate representation and then into a target representation. The first representation can take numerous forms, including a system model that contains hardware components, software components or some combination thereof. Additionally, the target representation can be in the form of a desired system implementation. The intermediate representation generated from the first representation can include both parallel and serial processes from the first representation. This intermediate representation then uses both serial and parallel processing techniques operating on the system model from within a single intermediate representation to translate the system model of the first representation into a target representation. The target representation may be in a format that is readily used in the creation of a system implementation by a user.

52 Claims, 8 Drawing Sheets

(56) References Cited

U.S. PATENT DOCUMENTS

| | | | |
|---|---|---|---|
| 2004/0006584 A1* | 1/2004 | Vandeweerd | 709/107 |
| 2004/0088685 A1* | 5/2004 | Poznanovic et al. | 717/140 |
| 2004/0205726 A1* | 10/2004 | Chedgey et al. | 717/125 |
| 2005/0198577 A1* | 9/2005 | Presler-Marshall et al. | 715/748 |

OTHER PUBLICATIONS

Gupta, Sumit. "The Spark Intermediate Representation," May 15, 1988, 2 pages, <http://mesl.ucsd.edu/spark/methodology/HTGs.shtml>.*

Kahn, Gilles, "The Semantics of Simple Language for Parallel Programming," in Information Processing 1974, 6 pages.*

Wu et al., "A Hierarchical CDFG as Intermediate Representation for Hardware/Software Codesign," 2002, IEEE, 4 pages.*

Gajski, Daniel et al., "High-Level Synthesis, Introduction to Chip and System Design," Kluwer Academic Publishers, Boston, pp. 137-177 (1992).

The MathWorks, "Real-Time Workshop for Use with Simulink, Getting Started, Version 6," The MathWorks, Inc. (2004), 130 pages.

The MathWorks, "Target Language Compiler, for Use with Real-Time Workshop, Reference Guide, Version 5," Chpt. 1, pp. 1-1-1-24 (2002).

International Search Report Application No. PCT/US2005/033863, dated Nov. 20, 2009.

Brisk, Philip et al., "Instruction Generation and Regularity Extraction for Reconfigurable Processors," Proceedings of the 2002 International Conference on Compilers, Architecture, and Synthesis for Embedded Systems, pp. 262-269 (2002).

Lee, Tien-Chien et al., "A Conditional Resource Sharing Method for Behavioral Synthesis of Highly Testable Data Paths," Proceedings of the IEEE International Test Conference on Designing, Testing, and Diagnostics, pp. 744-753 (1993).

International Search Report and Written Opinion for Application No. PCT/US2005/033863, dated Mar. 9, 2010.

* cited by examiner

EXTENSIBLE INTERNAL REPRESENTATION OF SYSTEMS WITH PARALLEL AND SEQUENTIAL IMPLEMENTATIONS

RELATED APPLICATION

This application claims priority to, and the benefit of, U.S. Provisional Application No. 60/611,659, filed on Sep. 20, 2004, for all subject matter common to both applications. The disclosure of the above-mentioned application is hereby incorporated by reference herein in its entirety.

FIELD OF THE INVENTION

The present invention generally relates to the translation of system behavior specifications into an implementation of the system, and in particular relates to an extensible translation methodology utilizing an intermediate representation capable of representing both parallel and sequential behaviors in arbitrary combinations.

BACKGROUND OF THE INVENTION

With advances in modern circuitry and the need to decrease the research and design phases of circuit construction, it has become both necessary and desirable to model circuit design prior to actual construction. A model allows a developer to model the characteristics of the circuit, as well as evaluate if it will meet the desired design requirements. Additionally, a modeled circuit may be rapidly reconfigured and various embodiments may be tested before a single piece of hardware is actually constructed.

A model may be constructed using numerous pieces of currently available software, including MATLAB®, Simulink®, and Stateflow® from The MathWorks, Inc. of Natick, Mass. Upon creation of a model, and evaluation of the model, it is desirable to generate a system implementation in a format readily exported for use in the actual hardware fabrication. For example, the desired system implementation can be in a hardware description language such as VHDL, Verilog or SystemC.

The process of translating a system model into a system implementation is computationally intensive, and ordinarily performed in many steps. To facilitate this process, an intermediate representation is used. The intermediate representation allows for the change in levels of abstraction from a source language to a target language and corresponding system implementation. Traditional intermediate representations use either a serial processing arrangement or a parallel processing arrangement. Serial processing is used for systems exhibiting sequential semantics. One such example of a system with sequential semantics is software running on a microcontroller.

In contrast to serial processing, parallel processing may be used when working with systems with parallel semantics such as combinational electronic circuits. Systems which accurately model a proposed design, however, are oftentimes best represented by both serial and parallel representations. Due to the inherent differences in the processing requirements of serial and parallel systems, existing technology uses distinct intermediate representations for each, wherein each system is processed independently. Independent processing using distinct intermediate representations requires extensive use of system resources, is time consuming, and requires the processing of the serial representations of a system using a first intermediate representation, and the parallel representations of a system using a second intermediate representation.

Furthermore, an inherent fundamental limitation exists when processing information using distinct intermediate representations. That is during processing of information in one intermediate representation, access to remaining pieces of information in the other intermediate representation is precluded. In light of this, optimization of processed data is detrimentally affected.

The foregoing discusses modeling and fabrication of electronic systems comprised of electronic hardware and software, but similar considerations apply to the modeling and fabrication of mechanical systems, biological systems, and other systems as understood by one skilled in the art.

SUMMARY OF THE INVENTION

It is an object of the present invention to translate a first representation into an intermediate representation, and in turn into target representation using the intermediate representation. The intermediate representation can translate both hardware and software system models using serial and parallel processing techniques executed from within a single intermediate representation. In one embodiment of the present invention the first representation can be in the form of a system model, and the target representation can be in the form of a desired system implementation. The present invention avoids the inherent fundamental limitations that exist when processing information using distinct intermediate representations of a serial and parallel process.

BRIEF DESCRIPTION OF FIGURES

An illustrative embodiment of the present invention will be described below relative to the following drawings.

DETAILED DESCRIPTION

Figure 1:
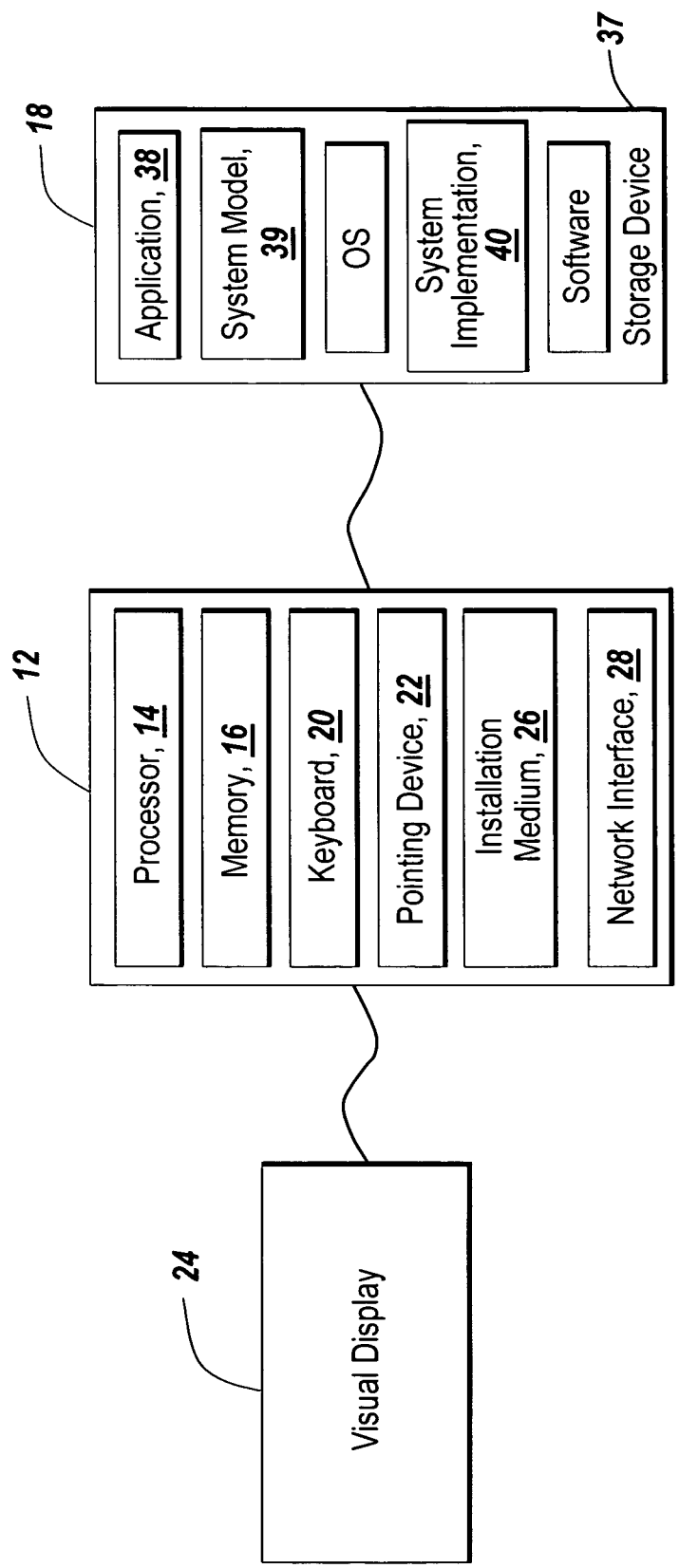
FIG. 1 is an exemplary model illustrating an environment suitable for practicing the illustrative embodiment of the present invention.

The present invention provides systems and methods for translating a first representation into an intermediate representation and, in turn, into a target representation. The first representation can be in the form of a system model, containing hardware components, software components or some combination thereof. The target representation can be in the form of a desired system implementation. The intermediate representation of the present invention is a single representation that includes both parallel and serial processes from the first representation. The intermediate representation translates the hardware components, software components or any combination thereof contained within the system model using serial and parallel processing techniques executed from within a single intermediate representation. The intermediate representation can then deliver data in a format for use in creation of a system implementation as required by a user.

Before proceeding with the remainder of the detailed description, it is first helpful to define a few terms used throughout the disclosure.

As used herein, the term "system model" is defined as a representation of a desired system. The system model may be constructed using numerous software packages for use in designing electronic, mechanical, biological, or other systems. For example, a Simulink® block diagram model environment, from The MathWorks of Natick, Mass., may be utilized in creating a system model for use with the present invention. In an alternate example, a SimMechanics® model environment, available from MathWorks of Natick, Mass., can be used in creating a system model representative of a physical system for use with the present invention. One skilled in the art will readily recognize that the system model may take numerous forms, each of which may be represented by various software packages.

As used herein, the term "system implementation" is defined as the syntax necessary for use in the fabrication of the components of the system as represented by a system model. A system implementation can include electronic circuitry, software running on a computer, or mechanical components.

The term "source language" is used herein to refer to a language which defines the system behavior of the system model. Examples of applicable source languages include, but are not limited to, a block diagram programming language, a statechart programming language, a matrix language, a hardware description language, a programming language or a graphical circuit design language. Programming environments such as Simulink®, Stateflow® and MATLAB®, from the MathWorks, Inc. of Natick, Mass., are representative environments which provide an applicable source language for use with the current invention, yet those skilled in the art will recognize that these are examples of applicable environments and are not intended to be an exhaustive list of applicable source languages.

The term "target language" is herein defined as the language necessary for generation of a system implementation. Examples of suitable target languages for use with the present invention include, but are not limited to C, C++, VHDL, Verilog and SystemC. It is also possible and sometimes desirable to use the above-mentioned source languages as target languages.

An "intermediate representation" is used herein to refer to a data structure that is stored in memory, in a file, in a database, or any other storage medium, and that is constructed from input data contained within a source language and from which part or all of the target language data is constructed in turn. The intermediate representation of the present invention further allows for the serial and parallel processing of the representation in the source language within the individual intermediate representation. In one embodiment of the present invention, the use of an intermediate representation allows for the translation of a representation in a source language to a representation in a target language such that a system implementation can be generated from an initial system model.

FIG. 1 depicts an environment suitable for practicing an illustrative embodiment of the present invention. The environment includes a computing device 12 having memory 16, on which software according to one embodiment of the present invention may be stored, a processor (CPU) 14 for executing software stored in the memory 16, and other programs for controlling system hardware. The memory 16 may comprise a computer system memory or random access memory such as DRAM, SRAM, EDO RAM, etc. The memory 16 may comprise other types of memory as well, or combinations thereof. A human user may interact with the computing device 12 through a visual display device 24 such as a computer monitor, which may include a graphical user interface (GUI). The computing device 12 may include other I/O devices such as a keyboard 20 and a pointing device 22, for example a mouse, for receiving input from a user. Optionally, the keyboard 20 and the pointing device 22 may be connected to the visual display device 24. The computing device 12 may include other suitable conventional I/O peripherals. The computing device 12 may support any suitable installation medium 26, a CD-ROM, floppy disks, tape device, USB device, hard-drive or any other device suitable for installing software programs capable of generating a system model for use in the present invention 105. The computing device 12 may further comprise a storage device 37, such as a hard-drive or CD-ROM, for storing an operating system and other related software, and for storing application software programs such as an application 38 which can generate a system model 39 for use with the present invention. Additionally, the operating system and the application 38 can be run from a bootable CD, such as, for example, KNOPPIX®, a bootable CD for GNU/Linux.

Additionally, the computing device 12 may include a network interface 28 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 28 may comprise a built-in network adapter, network interface card, PCMCIA network card, card bus network adapter, wireless network adapter, USB network adapter, modem or any other device suitable for interfacing the computing device 12 to any type of network capable of communication and performing the operations described herein. Moreover, the computing device 12 may be any computer system such as a workstation, desktop computer, server, laptop, handheld computer or other form of computing or telecommunications device that is capable of communication and that has sufficient processor power and memory capacity to perform the operations described herein.

In one embodiment, the present invention provides an application 38 capable of generating a system model 39. In brief overview, the application 38 allows for the generation of a system model 39 which can be converted into a system implementation 40 using an intermediate representation. The application 38 provides an environment for creating, designing, simulating, testing and verifying a representation of an electronic circuit, a component of the circuit, or a system in which the circuit is part of under a variety of conditions.

Figure 2A:
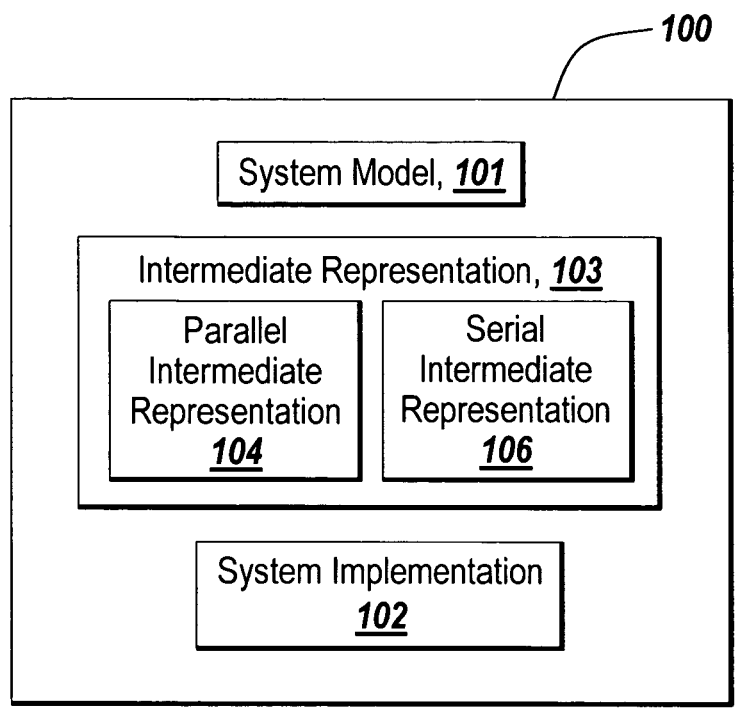
FIG. 2A is an exemplary graphical model illustrating an environment suitable for practicing the illustrative embodiment of the present invention.

FIG. 2A is an exemplary graphical representation of a system 100 for translating a system model 101 into a system implementation 102. Contained within the system 100 is the system model 101, wherein the system model 101 is represented by a source language. The system model 101 and associated source language is associated with an intermediate representation 103. The intermediate representation 103 allows for the processing of translation tasks associated with the translation of system model 101 to system implementation 102 in discrete stages. An intermediate representation 103, as described in FIG. 2A, therefore has some subsystems that are serial in nature and some that are parallel in nature. As both parallel and serial representations 104, 106 are hierarchical in nature, the behavior of a single node in a data flow graph may be specified by a data flow graph. Similarly, the behavior of a single node in a control flow graph may be specified by a control flow graph. In light of this the parallel and serial representations 104, 106 may be intermixed to form the intermediate representation of the present invention 103. In this invention, the behavior of a single node in a data flow graph may be specified by a control flow graph. Similarly, the behavior of a single node in a control flow graph may be specified by a data flow graph. This hierarchical mixture of parallel and sequential representations may be repeated to arbitrary depth. For example, a first data flow graph may contain a single node whose behavior is specified by a first control flow graph. Said first control flow graph may have a node whose behavior is specified by a second data flow graph. Said second data flow graph may have a node whose behavior is specified by a second control flow graph. This example is illustrative only, and one skilled in the art will understand that the present invention supports arbitrary combinations of serial and parallel behavior.

Utilizing the intermediate representation 103 of the present invention a system implementation 102 can be created. In one embodiment of the present invention, the system implementation 102 can be in a hardware description language such as VHDL, a programming language such as C or C++, an electronic database format, or some combination thereof. This system implementation 102 can be readily used to fabricate the system using software and hardware components. For example, the system implementation 102 can include a Verilog data file which can be used with existing semiconductor fabrication techniques, as understood by those skilled in the art, to construct an electronic circuit. In an alternate embodiment, the system implementation 102 can include C or C++ source code, which can be used in conjunction with a compiler and operating system, as understood by those skilled in the art, to create an executable program.

Figure 2B:
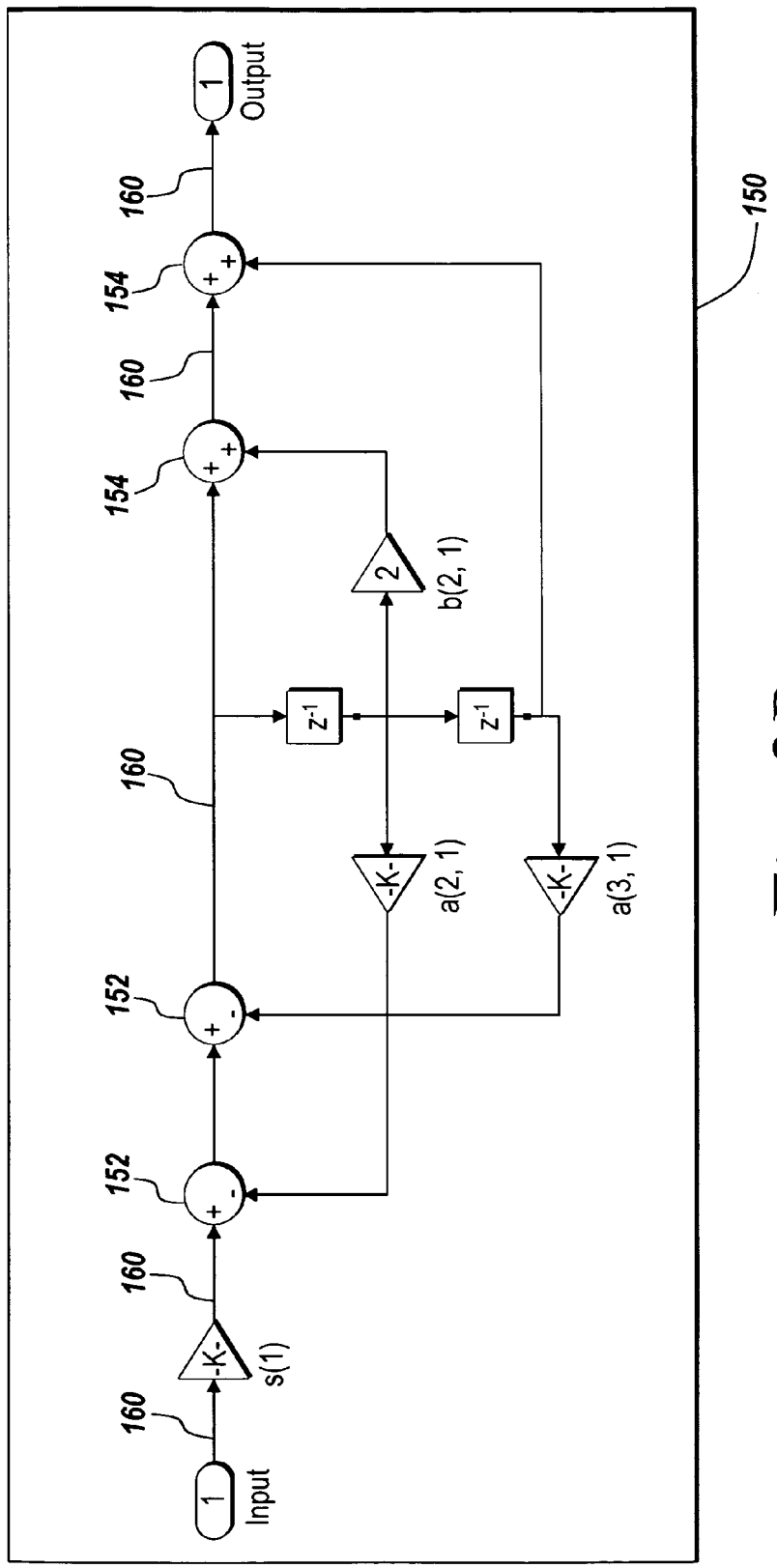
FIG. 2B is an illustrative example of a model with parallel semantics.

FIG. 2B is an exemplary representation of a system 150 with parallel semantics. A data flow graph is used to describe a system with parallel semantics, wherein nodes represent units of computation and signals represent paths through which data flows from one node to another. Parallel systems execute operations in parallel, thereby offering increased speed in computation and execution. The system 150 includes components 152 and 154 connected by signal paths 160. Each component 152, 154 can be viewed as an individual unit of computation, while signal paths 160 represent the flow of information through and between components 152, 154. Each signal path has an associated type to indicate what kind of information flows across them. For example, a signal's type may be fixed point, floating point, integer, real, complex and the like.

Figure 2C:
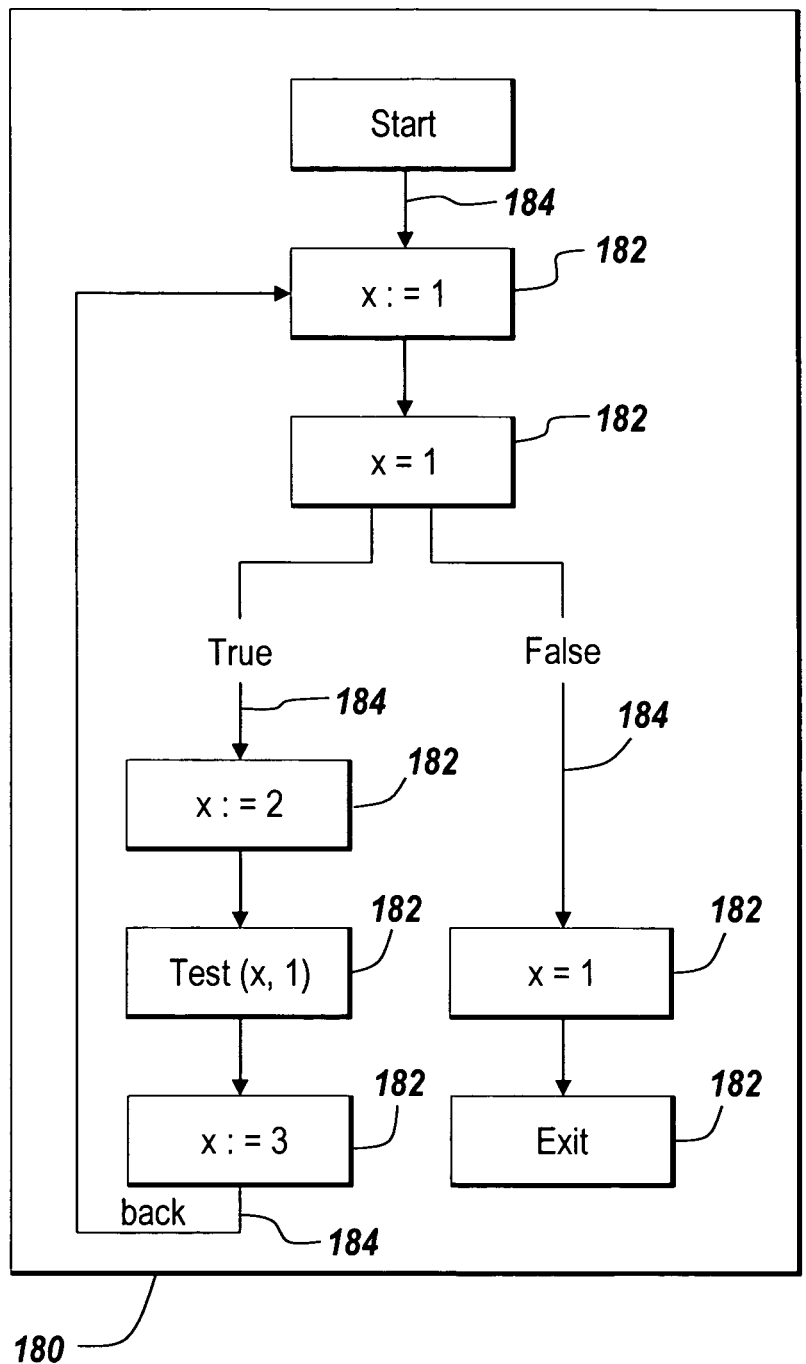
FIG. 2C is an illustrative example of a model with serial semantics.

FIG. 2C illustrates an exemplary control flow graph of a system 180. System 180 includes serial semantics. Series execution, as compared to parallel execution, offers a decreased need for processor resources at the expense of a potentially slower processing speed. The execution of operations within a serial representation are performed in sequence. For example, the control flow graph of system 180 includes nodes 182 connected by control flow edges 184. Each control flow edge 184 indicates the next potential computation which may be processed as well as the order by which it is to be processed. Each node is representative of a unit of computation. Information within the sequential system is represented by variables and constants, wherein constants represent a value drawn from a specific data type and variables further contain an associated data type describing the information they can contain. The type assigned to each variable may be fixed point, floating point, integer, real, complex and the like. The use of control flow graphs when representing a serial intermediate representation serves as an indication of one type of serial system. Those skilled in the art will appreciate that the serial representation can be represented by various other forms, such as an abstract syntax tree and a three address code, which allows for the representation of intermediate code at compiling.

Figure 3:
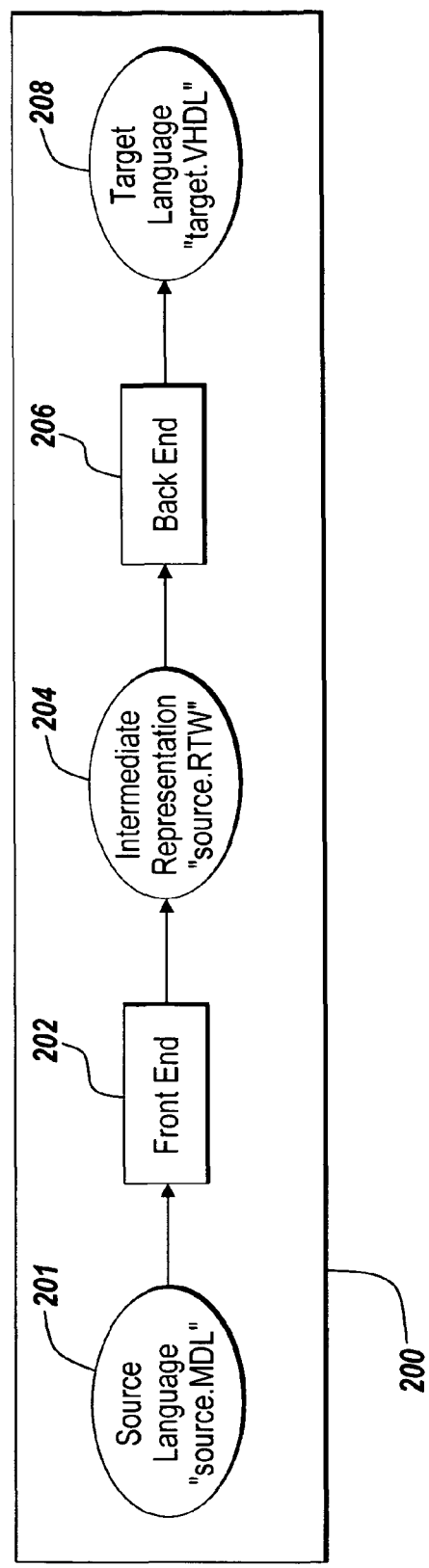
FIG. 3 is an exemplary graphical model for use in illustrating an environment for practicing the illustrative embodiment of the present invention.

FIG. 3 is an exemplary graphical model 200 suitable for use in practicing an embodiment of the present invention. The graphical model 200 illustrates a front end 202 to receive a system representation in a single source language 201 and in turn output an intermediate representation 204. The intermediate representation 204 is passed to a back end 206 which processes the intermediate representation to output a system representation in a target language 208. The target language 208 can further be used by an external program to generate executable code or hardware or even be processed further. Those skilled in the art will recognize that a plurality of source languages 201, front ends 202, back ends 206 and target languages 208 can be employed in simultaneous fashion in the present invention based upon the needs of the user.

The source language 201 suitable for use with the present invention can be any language that adequately defines the system behavior. Examples of applicable source languages include, but are not limited to, a block diagram programming language, a statechart programming language, a matrix language programming language, a hardware description language, a programming language or a graphical circuit language. In the present embodiment, illustrative file "source.mdl" is shown. This illustrative file "source.mdl" may be created by a block diagram model environment, such as Simulink® from The MathWorks of Natick, Mass.

The front end 202 of the present invention receives the illustrative "source.mdl" file and translates the file into an intermediate representation 204. The intermediate representation 204 of the present invention is in a source and target language independent format, such that data contained within the intermediate representation is not specific to the source language 201 from which it was generated. The data contained within the intermediate representation 204 is used for subsequent code generation and the eventual generation of a representation of the data using a target language 208.

The front end 202 of the present invention is capable of converting a source language 201 of one of a variety of types into one or more intermediate representations 204, such that various system models can be used to describe individual behaviors of the modeled system using the most applicable language for the desired results. The front end 202 of the present invention is therefore capable of translating these various source languages 201 into a single intermediate representation 204 for use in conversion into the target language 208.

The translation of the source language 201 to the intermediate representation 204 can be completed using numerous means recognized by those skilled in the art. One suitable example is the Real-Time Workshop® (RTW) coder, offered by The MathWorks of Natick, Mass. This coder can be utilized in converting a source language 201 to an intermediate representation 204. Using the RTW coder the file "source.mdl" in the source language 201 is converted into an intermediate representation 204, wherein the file contained within the intermediate representation 204 is in a source and target language independent format. The associated file within the intermediate representation 204 is illustrated as "source.rtw". The use of the RTW coder is a representative example, and those skilled in the art will readily recognize that the intermediate representation can be generated using numerous coding mechanisms for processing serial and parallel source languages.

The back end 206 translates the intermediate representation 204 into the intended target language 208. For illustrative purposes, a single back end 206 is shown, wherein the back end 206 can yield a single description of the system in the desired target language 208. In the present embodiment, the files "source.rtw" is translated by the back end 206 to yield a target file "target.VHDL" in a target language 208. The generated target file "target.VHDL" can further be used to fabricate an electronic circuit using automated microprocessor manufacturing techniques understood by those skilled in the art. In another embodiment, the back end 206 outputs a target language 208 in C or C++ format. The target language 208 can then be used with an external compiler to generate executable code as required.

Figure 4:
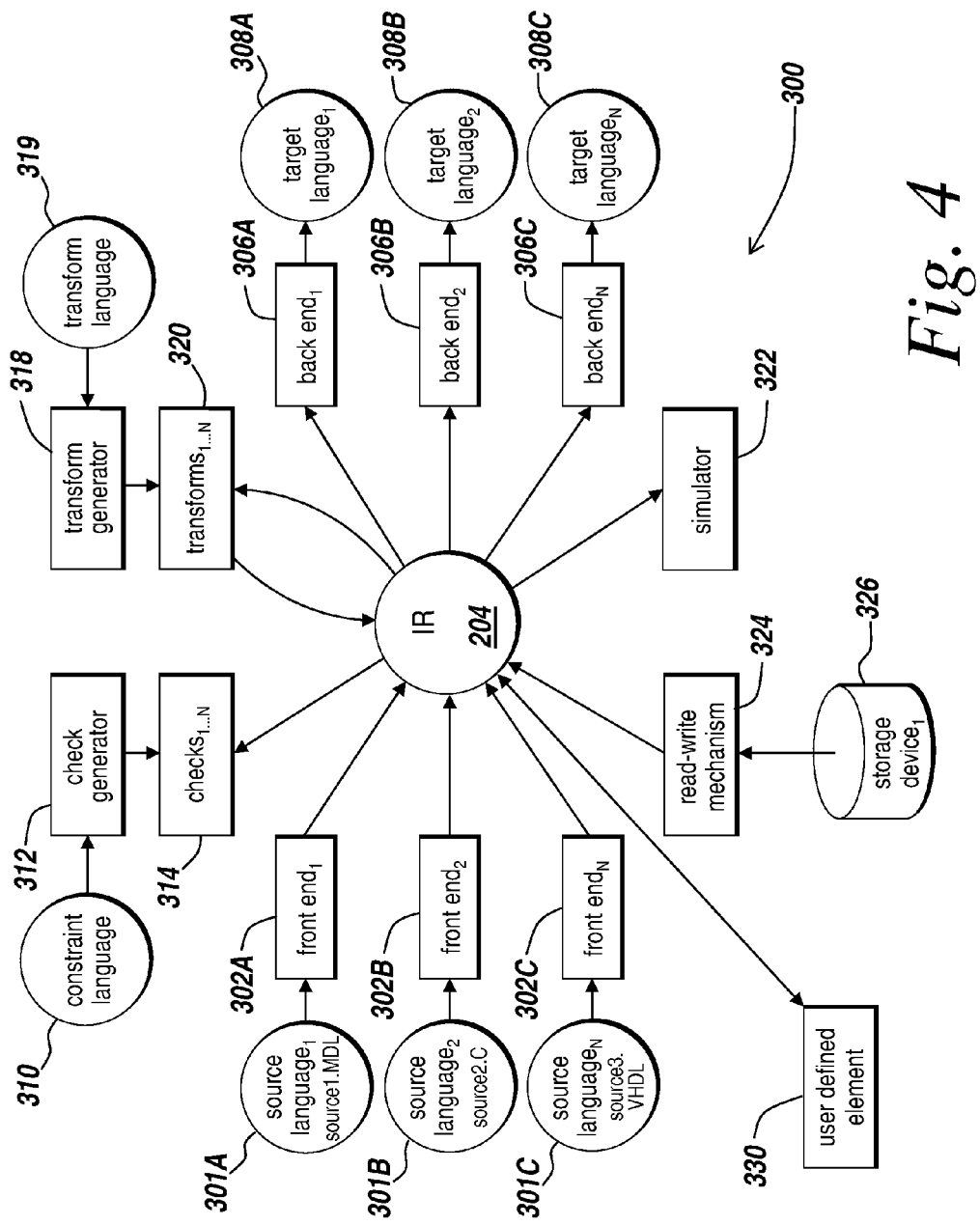
FIG. 4 is an exemplary graphical model for use in illustrating an environment for practicing the illustrative embodiment of the present invention comprising multiple source languages and multiple target languages.

FIG. 4 illustrates an embodiment of the present invention 300 when utilized with a plurality of source languages, for example source languages 301A, 301B, 301C and a plurality of target languages, for example target languages 308A, 308B, 308C. Associated with each of said plurality of source languages 301A, 301B, 301C are a plurality of front ends, for example front ends 302A, 302B, and 302C. Further associated with each of said plurality of target languages 308A, 308B, 308C are a plurality of back ends, for example back ends 306A, 306B, and 306C.

In the present embodiment, each source language 301A, 301B, 301C can be in a different format or of a different type. For example, the first source language 301A may be a parallel processed block diagram language. For example, a Simulink® block diagram model can be used to generate a first parallel source representation. The second source language 301B may be a serially processed programming language. An illustrative example of such a serial representation can be generated in the MATLAB® programming environment. The third source language 301C may further be a parallel processed circuit schematic. Those skilled in the art will readily recognize that numerous additional serially processed and parallel processed source languages can be utilized by the present invention.

Each of said plurality of front ends 302A, 302B, and 302C can receive the associated source language 301A, 301B, 301C and translate the source language into the intermediate representation 204. The intermediate representation 204 can receive both serial and parallel source languages and convert them into a source and target language independent format. For illustrative purposes, a single parallel source language, namely source.mdl, is show in the present figure. Those skilled in the art will recognize that a plurality of source languages can be used in conjunction with the present invention, wherein these languages are serial, parallel or some combination thereof.

Associated with the intermediate representation 304 are a plurality of back ends 306A, 306B, 306C, wherein each back end 306A, 306B, 306C is capable of translating some, or all, of the intermediate representation 204 into a final target language 308A, 308B, 308C. In the present embodiment, the first back end 306A, for example, can process a portion of the internal representation 204 in software, thereby yielding a first representation in a source language 308A in C or C++. The second back end 306B, for example, can process a portion of the intermediate representation 204 that is implemented in software, resulting in a second target language 306B that is in FORTRAN. The third back end 306C, for example, can process a portion of the intermediate representation 204 implemented in electronic circuitry, thereby yielding a representation in an applicable target language such as VHDL or Verilog.

A constraint language 310 can further be associated with the system 300 of FIG. 4. For illustrative purposes a single constraint language 310 is illustrated, yet those skilled in the art will recognize that a plurality of constraint languages 310 may be incorporated into the present invention. The constraint language 310 defines a set of constraints applicable to the system 300. The constraint language 310 is used by the check generator 312 to generate a series of checks 314. Checks are used to verify that the system 300 conforms to the constraints set forth in the constraint language 310. Checks 314 provides a test to measure the correctness, desirability, quality, or any other property of a source language program, IR construct, transform result, state of the translation process, or any other aspect of the translation.

Checks for use with one embodiment of the present invention may take two forms, namely an internal check or an external check. Internal checks verify proper behavior of the translation system itself, namely that the translation system operated absent any bugs within translation system code. In comparison, external checks verify properties of the user's inputs to the system.

The use of checks 314 in accordance with the present invention provides a means by which the intermediate representation 204 can be utilized to verify system integrity. For example, if we wish to verify that a particular intermediate representation 204 construction never occurs during translation, wherein the systems intermediate representation 204 can be serialized to/from text, a check can be created to determine if the intended construction occurs. The use of a text file is utilized solely for illustrative purposes, and one skilled in the art will readily recognize that the input may take numerous forms as understood by one skilled in the art. Firstly, a serialized text file is created containing the intermediate representation 204 construction of interest, wherein the construction is expressed as a textually serialized intermediate representation. One embodiment of the present invention then reads this text file and automatically constructs a software function that attempts to locate the particular construction of interest. If this construction of interest if located, the appropriate action is taken.

Checks 314 may further include, but are not limited to the verification that a source language 301A, 301B, 301C has the proper syntax, or the verification that the system 300 does not use features that are unavailable in the applicable target language 308A, 308B, and 308C. For illustrative purposes the constraint language 310, check generator 312, and checks 314 are illustrated external to the intermediate representation 204. In an alternate embodiment, the constraint language 310, check generator 312 and checks 314 can be internal to the intermediate representation as understood by those skilled in the art. Furthermore, in an alternate embodiment, the constraint language 310 may incorporate the intermediate representation 204 as part of the specification of the constraint. For example, the constraint language 310 can use a system model to describe system structures that are not permitted.

A transform generator 318 can additionally be associated with the system 300 of the present invention. The transform generator 318 accepts a transform language 319, wherein the transform language 319 describes the intended actions of the generated transform 320. A transform language 319 must identify a portion of the intermediate representation 204 to be transformed and subsequently modify that portion of the intermediate representation 204. In the present invention, the intermediate representation 204 can be used, wholly or in part, to specify the portion of the intermediate representation to be transformed, or the modification to be made to that portion.

In one embodiment, the transform language 319 may be used to identify a particular intermediate representation 204 construct (the pattern) and replace it with a different construct (the replacement). For illustrative purposes, the intermediate representation 204 will be assumed to be serialized from text. One skilled in the art will recognize, however, that the intermediate representation can take numerous additional forms wherein alternate transform languages 319 are used. Additionally, more than one transform language 319 may be used in conjunction with the intermediate representation 204 in accordance with the present invention. Furthermore, actions conducted by the intermediate representation may extend beyond the illustrated pattern match and replace noted by example. For example, the replacement may be modified by changing a node kind, or data type, or the topology of the replacement intermediate representation 204 construct. These modifications of the replacement may be controlled by parameters of the transform, properties of the pattern match (data type, node kind, etc), or any other appropriate means.

A serialized text file is therefore created containing the intermediate representation 204 construct of the pattern, expressed as a textually serialized intermediate representation. A second serialized text file is further created containing the intermediate representation construct of the replacement, expressed as a textually serialized intermediate representation. The present invention then reads both text files and automatically constructs a software function that attempts to locate the pattern, and if it succeeds, replace the pattern with the replacement.

In an alternate example, a transform 320 may be a lowering transform, wherein the transform takes a complicated operation and breaks it down into simpler operations. The transform 320 is in communication with the intermediate representation 204 such that the generated transform 320 can operate on data contained within the intermediate representation 204. In the present embodiment, a single transform 320 is shown, but those skilled in the art will readily recognize that a plurality of transforms 320 can be used in the present invention. For illustrative purposes the transform language 319, transform generator 318 and transforms 320 are illustrated external to the intermediate representation 204. Those skilled in the art will recognize that the functions performed by the transform language 319, transform generator 318 and transforms 320 can be internal to the intermediate representation 204. Furthermore, the transform language 319 may incorporate the intermediate representation 204 as part of the specification of the transform. For example, the transform language 319 may use a system model to describe the desired results of the transform, or to describe the system structures on which the transform may be performed.

A simulator 322 can additionally be associated with the intermediate representation 304 of the present invention such that the simulator 322 can be used in testing the intended system. The simulator 322 is useful in evaluating the intermediate representation 204 to verify that the initial system model is correctly represented following the execution of transforms on the intermediate representation 204. The simulator 322 can be used following the application of a transform 320 on the intermediate representation 204, the output of which can be compared to the initial system model. Using the simulator 322 in such a manner, the performance of each transform can be evaluated to verify that the results are correct.

A read-write mechanism 324 can further be associated with the intermediate representation 204 of the system 300. The read-write mechanism 324 is associated with a storage device 326, wherein the storage device 326 is capable of storing intermediate representations 204. The read-write mechanism can save and subsequently load intermediate representations 304 thereby aiding in the translation of a source language to a target language, and aiding in the testing of part or all of the system 300.

The system 300 of the present invention can further allow for a user defined element 330, wherein the user defined element 330 can communicate with the internal representation 304. These user defined elements 330 allow a user to create components with custom behavior specific to the industry and modeling requirements of the user. Additionally, a user may define their own graph nodes to represent any computation required, or may further define the context of data types used with the invention. Such user defined elements 330 allow for the extensibility of the present invention, thereby allowing the generation of custom data types, custom components, custom nodes, custom checks, custom transforms, custom front ends, custom back ends, or any combination thereof. In one embodiment, an application program interface (API) may be used such that a user-written software module can register a new user-defined node, a special name or special syntax enabling a front end to understand when to create the user-defined node while translating the source language into an intermediate representation, a user-written transform to lower the user-defined node into a set of nodes already understood by the translation system, a user-written back end function to emit target language text for the user-defined node, or a user-written function to simulate the user-defined node in the context of the intermediate representation simulator (322). Using such tools, a user, via a user defined node, can write their own checks, transforms, front ends, back ends, etc. for use with the present invention.

Figure 5:
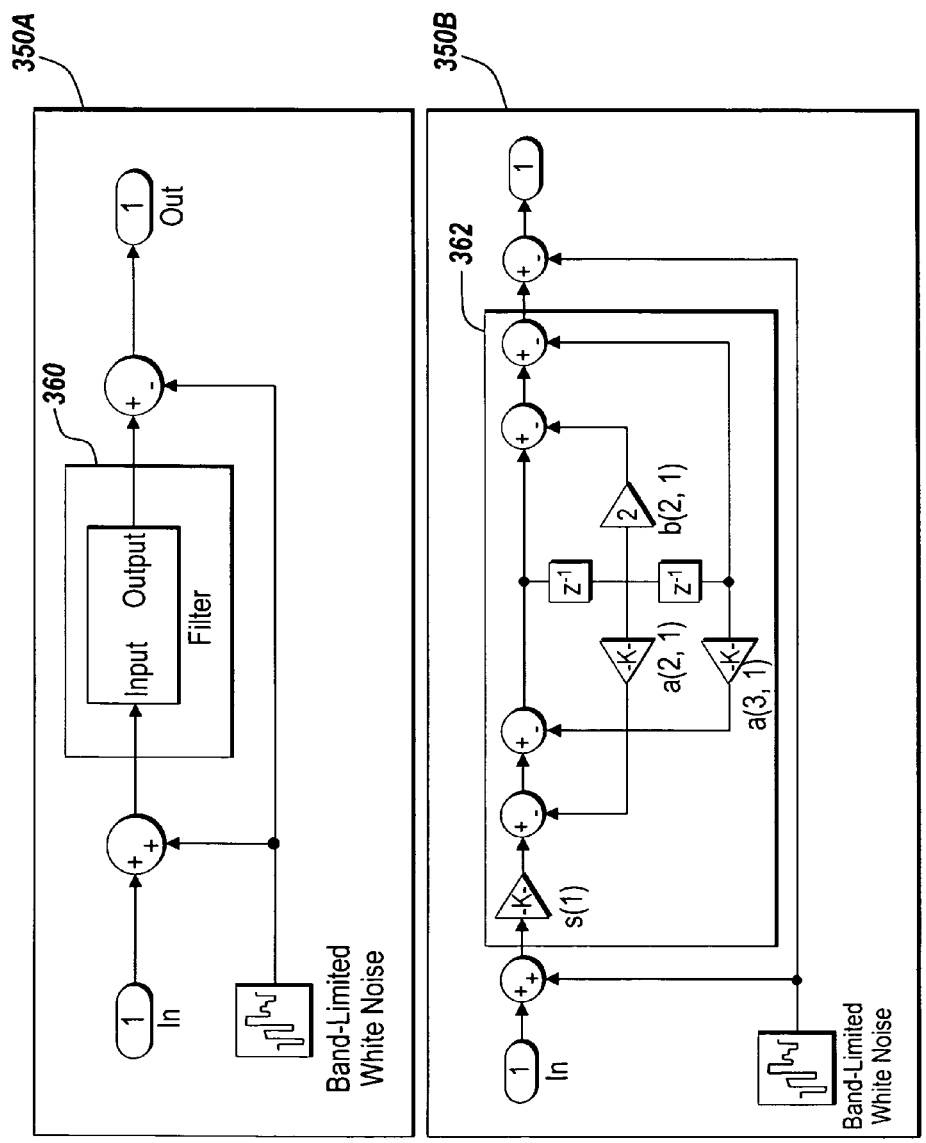
FIG. 5 is an exemplary graphical model for use in illustrating an environment for practicing the illustrative embodiment of the present invention wherein a transform is performed on a portion of the model.

FIG. 5 is an illustrative embodiment of a parallel system 350A wherein a transform is applied to a portion of the system. The parallel system 350A includes a filter 360 associated with the system 350A. A lowering transform, for example, can be applied to the filter 360, such that the complicated operations within the filter 360 can be broken down into simpler operations. Following the application of a lowering transform to the filter 360 of the parallel system 350A, a simplified system 350B is created, wherein the filter 360 has been replaced by a series of simpler functions 362. In the illustrative embodiment the application of a lowering transform has been depicted. Those skilled in the art will recognize that there exist numerous other applicable transforms for use with the current invention.

The transform applied to the system model of FIG. 5 can further be represented using a transform language. The transform language can include a first system model 350A containing a single filter block 360 to describe where the transform can be applied. The transform language can further include a second system model 350B, wherein the network of blocks representing simpler operation 362 are defined as applicable replacements for the filter 360 of the first system model 350A.

Figure 6:
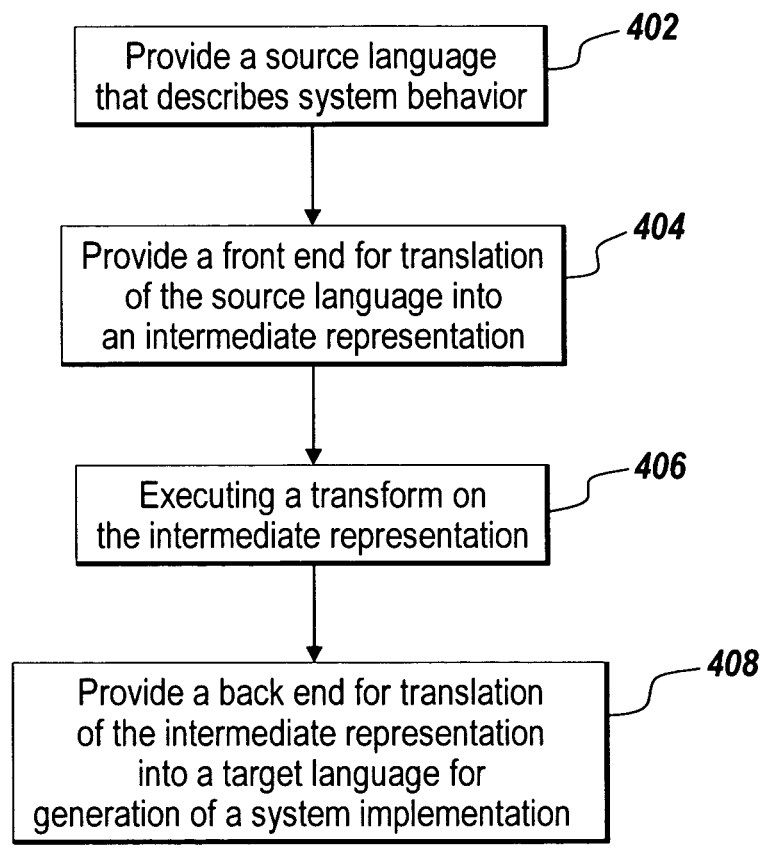
FIG. 6 is a flow chart illustrating the steps in practicing the present invention.

FIG. 6 is an exemplary flow chart illustrating steps taken in practicing the present invention. In step 402 a source language describing system behavior is provided. In step 404 the front end translates the source language into the intermediate representation. In step 406, a transform may be executed on data contained within the intermediate representation. The transform may be executed by a part of the present invention, or by an external tool, or manually by the user. A back end then translates the intermediate representation into a target language for generation of a system implementation in accordance with step 408.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

We claim:
1. A method comprising:
 generating, using a computing device, an intermediate representation of a first implementation represented by a source language,
  where the intermediate representation includes:
   a data flow graph at a first hierarchical level of the intermediate representation,
    the data flow graph including a plurality of nodes, and
    the data flow graph representing a parallel semantic of the first implementation in which operations of the data flow graph are executed in parallel with each other, and
   a control flow graph at a second hierarchical level of the intermediate representation, where:
    the control flow graph specifies a behavior of a single node of the plurality of nodes of the data flow graph, and
    the control flow graph represents a sequential semantic of the first implementation; and
 generating a second implementation from the intermediate representation,
  the second implementation being represented by a target language and including:
   the parallel semantic of the first implementation, and
   the sequential semantic of the first implementation.
2. The method of claim 1, wherein the first implementation is a system model.
3. The method of claim 2, wherein the system model is designed using a block diagram model environment.
4. The method of claim 2, wherein the system model is designed using a matrix language.
5. The method of claim 2, wherein the system model is designed using a statechart language.
6. The method of claim 1, wherein the source language contains parallel processing characteristics.
7. The method of claim 1, wherein the source language contains sequential processing characteristics.
8. The method of claim 1, wherein the second implementation is a system implementation.
9. The method of claim 8, wherein the system implementation includes syntax for a fabrication of hardware represented by the first implementation.
10. The method of claim 9, wherein the hardware includes one or more electronic devices.
11. The method of claim 1, wherein the intermediate representation provides a mechanism for changing a level of abstraction from the first implementation to the second implementation.
12. The method of claim 1, further comprising:
 providing a check generator,
  wherein the check generator is in communication with the intermediate representation.
13. The method of claim 1, further comprising:
 verifying proper behavior of a translation system that implements the method of claim 1.
14. The method of claim 1, further comprising:
 verifying an integrity of the first implementation.
15. The method of claim 1, further comprising:
 verifying that the first implementation is implemented in accordance with a syntax of the source language.
16. The method of claim 1, further comprising:
 verifying that the second implementation does not include features that are unavailable in the target language.
17. The method of claim 1, further comprising:
 providing a transform generator that generates a transform based on a transformation language.
18. The method of claim 17, wherein the transform generator provides a transform function for use in changing a level of abstraction of the first implementation.
19. The method of claim 17, wherein the transformation language describes an intended action of the transform.
20. The method of claim 17, wherein the transformation language identifies a portion of the intermediate representation that is modified.
21. The method of claim 17, wherein the transformation language identifies an initial pattern construct, in the intermediate representation, that is replaced with a replacement construct.
22. The method of claim 1, where the intermediate representation is modified by an external tool before the second implementation is generated.
23. The method of claim 1, where the intermediate representation is manually modified before the second implementation is generated.
24. The method of claim 1, further comprising:
 providing a user defined element for use with the intermediate representation.
25. The method of claim 24, wherein the user defined element allows a creation of at least one of a custom data type, a custom component, a custom node, a custom check, a custom transform, a custom front end, or a custom back end.
26. A system comprising:
 a computing device comprising:
  a memory; and
  a processor configured to:
   generate an intermediate representation of a first implementation represented by a source language,
   where the intermediate representation includes:
    a data flow graph at a first hierarchical level of the intermediate representation,
     the data flow graph including a plurality of nodes, and
     the data flow graph representing a parallel semantic of the first implementation in which operations of the data flow graph are executed in parallel with each other, and
    a control flow graph at a second hierarchical level of the intermediate representation, where:
     the control flow graph specifies a behavior of a single node of the plurality of nodes of the data flow graph, and the control flow graph represents a first sequential semantic of the first implementation; and
generate a second implementation from the intermediate representation,
the second implementation being represented by a target language and including:
the parallel semantic of the first implementation, and
the sequential semantic of the first implementation.

27. The system of claim 26, wherein the first implementation is a system model.

28. The system of claim 27, wherein the system model is designed using a block diagram model environment.

29. The system of claim 27, wherein the system model is designed using a matrix language.

30. The system of claim 27, wherein the system model is designed using a statechart language.

31. The system of claim 26, wherein the source language contains one or more parallel processing characteristics.

32. The system of claim 26, wherein the source language contains one or more sequential processing characteristics.

33. The system of claim 26, wherein the second implementation is a system implementation.

34. The system of claim 33, wherein the system implementation includes syntax for a fabrication of hardware represented by the first implementation.

35. The system of claim 33, wherein the system implementation includes syntax for a fabrication of software represented by the first implementation.

36. The system of claim 26, wherein the intermediate representation provides a mechanism for changing a level of abstraction from the first implementation to the second implementation.

37. The system of claim 26, further comprising a check generator,
wherein the check generator is in communication with the intermediate representation.

38. The system of claim 26, wherein the system verifies proper behavior of the system itself.

39. The system of claim 26, wherein the system verifies an integrity of the first implementation.

40. The system of claim 26, further comprising a transform generator,
wherein the transform generator is in communication with the intermediate representation.

41. The system of claim 26, wherein a transform changes a level of abstraction of the first implementation.

42. The system of claim 26, further comprising a user defined element for use with the intermediate representation.

43. The system of claim 42, wherein the user defined element represents a graph node defining an intended computation process.

44. The system of claim 42, wherein the user defined element defines a context of one or more data types for use with the system.

45. A non-transitory computer-readable storage medium storing instructions, the instructions comprising:
one or more instructions that, when executed by a processor, cause the processor to:
generate an intermediate representation of a first implementation represented by a source language,
where the intermediate representation includes:
a data flow graph at a first hierarchical level of the intermediate representation,
the data flow graph including a plurality of nodes, and
the data flow graph representing a parallel semantic of the first implementation in which operations of the data flow graph are executed in parallel with each other, and
a control flow graph at a second hierarchical level of the intermediate representation, where:
the control flow graph specifies a behavior of a single node of the plurality of nodes of the data flow graph, and
the control flow graph represents a sequential semantic of the first implementation; and
generate a second implementation from the intermediate representation,
the second implementation being represented by a target language and including:
the parallel semantic of the first implementation, and
the sequential semantic of the first implementation.

46. The non-transitory computer-readable storage medium of claim 45, wherein the first implementation is a system model.

47. The non-transitory computer-readable storage medium of claim 45, wherein the source language contains one or more parallel processing characteristics.

48. The non-transitory computer-readable storage medium of claim 45, wherein the source language contains one or more sequential processing characteristics.

49. The non-transitory computer-readable storage medium of claim 45, wherein the second implementation is a system implementation.

50. The non-transitory computer-readable storage medium of claim 45, further storing one or more instructions for:
changing a level of abstraction from the first implementation to the second implementation.

51. The non-transitory computer-readable storage medium of claim 45, where the control flow graph specifies a behavior of a single node of another data flow graph.

52. The non-transitory computer-readable storage medium of claim 45, where the intermediate representation further includes another data flow graph that specifies a behavior of a single node of the control flow graph.

* * * * *